INVENTOR.
Gunnar Heskestad
ATTORNEY

United States Patent Office 3,360,221
Patented Dec. 26, 1967

3,360,221
FLUID DYNAMICS OF A BLUFF BODY
Gunnaro Heskestad, Piscataway, N.J., assignor to American Standard Inc., a corporation of Delaware
Filed Feb. 25, 1966, Ser. No. 529,984
10 Claims. (Cl. 244—42)

ABSTRACT OF THE DISCLOSURE

A bluff body, which has a side wall and a rear wall angularly related thereto to define a corner there-between, is provided for movement in a homogeneous fluid. A slot is provided at the corner and suction means is connected to the slot. An exhaust slot is also provided which is connected to the corner slot by appropriate conduit means. Accordingly, by applying suction to the corner slot, then as the body moves through the fluid, a lift force is generated on the body even though the body is a bluff body.

This invention pertains to the fluid dynamics of bluff bodies and more particularly of generation of lateral forces for a bluff body.

One of the most common applications of fluid dynamics on a body is concerned with the aerodynamics of an airfoil used in aircraft. The primary concern in the aerodynamics of an airfoil is to produce a lateral force which usually takes the form of a lift. The lift force on an airfoil is produced by the "bound" circulation in the real flow which is superimposed on the inviscid flow of the fluid about the airfoil. The "bound" circulation is defined as the line integral of the velocity vector around any path surrounding the airfoil and may be thought of as a vortex motion. This circulation arises because the real flow cannot turn the sharp corner of the airfoil's trailing edge, a sufficient condition for preventing this being that a clockwise vortex motion is superimposed on the basic inviscid flow. This condition has been verified experimentally to exist for small to moderate angles of incidence while not for large angles of incidence. Neglecting other effects of viscosity except for creating "bound" circulation, the net force on the airfoil is directed upward normal to the approach flow and is proportional to the "bound" circulation. This force is the lift force. Actually a drag force (force in the direction of approach flow) also exists as a result of frictional effects at the airfoil surface. The "bound" circulation generated for any particular angle of incidence is that which is required to shift the rearward stagnation point (point of zero velocity) to the trailing edge. This value increases with increasing angles of incidence.

The flow toward and near the trailing edge along the upper surface sees an increasing pressure or an "adverse pressure gradient." The adverse pressure gradient increases with increasing angles of incidence. Beyond a certain angle the low energy in the boundary layer is not able to overcome the increasing pressure and breaks away (separates) from the upper surface (stall). At large angles of incidence the flow behind the airfoil is relatively stagnant and is separated from the outside flow by turbulent mixing layers. A lift force still exists on the airfoil but of much smaller magnitude than before stall occurs. Additionally, a very high drag force exists.

Although airfoils have been used successfully in aircraft and the like they are quite often very difficult to design and operate over specialized velocity ranges. A much simpler type of profile is presented by a bluff body. A bluff body may be defined as a body having a cross-stream dimension comparable to its streamwise dimension. Such bodies while being much simpler to design and fabricate heretofore have not had the appropriate aerodynamic properties for creating lift.

It is a general object of the invention to provide an improved method of generating forces operating laterally on a fluid dynamic body moving through a viscous fluid.

Briefly, according to the invention, a lateral force is exerted on a bluff body moving through a viscous fluid by applying suction to the peripheral edge between a side wall and a rear wall of the body which is angularly connected to the side wall.

It is another general object of the invention to provide an improved type of airfoil which is much simpler to fabricate but which has aerodynamic properties such as lift.

It is yet another object of the invention to provide an improved fluid dynamic body which can generate forces lateral to the general direction of movement of the body while having a much simplified geometric configuration.

It is a further object of the invention to provide an airfoil in the form of a bluff body which has considerable lift properties.

Briefly, the invention contemplates a bluff body for movement in a homogeneous fluid wherein the body includes a side wall having a peripheral edge and a rear wall having a peripheral edge angularly connected to the adjacent peripheral edge of the side wall. A peripheral opening is provided along at least adjacent portions of the peripheral edges of the rear and side walls. At least another opening is provided in one of the walls. There are conduit means within the body for connecting the openings. A fluid moving means is associated with the conduit means for drawing fluid via one of the openings into the conduit means and discharging the fluid from the conduit means via the other opening.

Other objects, features and advantages of the invention will be apparent from the following detailed description when read together with the accompanying drawing which shows by way of example and not limitation the now preferred embodiment of the invention.

Figure 6:
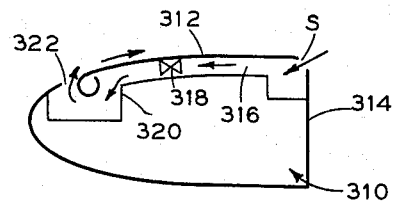
Figure 7:
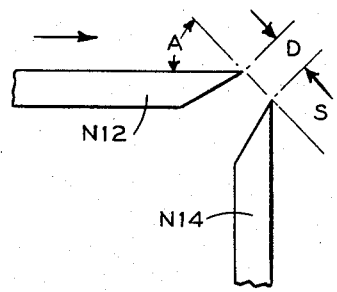

FIG. 6 schematically shows a bluff body with means for providing for automatic peripheral edge suction; and FIG. 7 shows the details of the peripheral slots through which the suction is applied.

Figure 1:
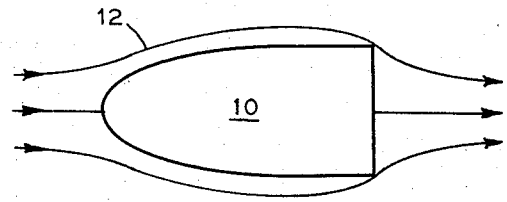
FIG. 1 shows schematically the inviscid flow around a bluff body when its axis of symmetry is aligned with the approach flow.
Figure 2:
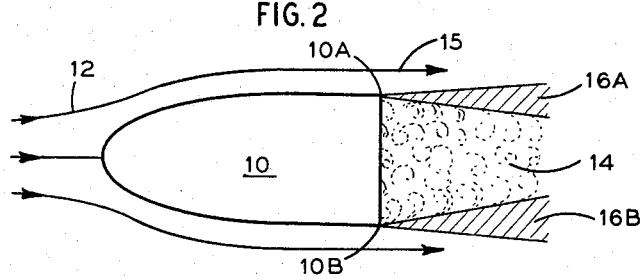
FIG. 2 shows the real flow around the bluff body of FIG. 1.

Referring now to FIGS. 1 and 2, there will be discussed the flow about a typical bluff body 10. Although the bluff body 10 is shown as being symmetric merely for the purpose of illustration the discussion will generally apply to any bluff body producing separation points at well defined trailing edges. FIG. 1 shows stream lines 12 of an inviscid fluid. It should be noted that the ideal inviscid fluid does turn around the sharp corners. However, as a practical matter, real viscous fluids do not turn around these well defined trailing edges.

As shown in FIG. 2, the real flow produces separation points 10A and 10B at the well defined corners. The flow 12 cannot turn the sharp corners of the trailing edges 10A and 10B and separates to form a relatively stagnant region 14 behind the body. This region 14 is separated from the exterior flow 15 by turbulent mixing layers 16. The mixing layers 16 are actually unstable and periodically and alternately roll up into vortices behind the body 10 to form a vortex trail in the wake. However, this effect will not be further discussed. The net effect is that a large drag force is created and no steady lift force is exerted on the body.

It has been found that by applying suction to a sharp corner it is possible to deflect the stream around the corner. Accordingly, in FIG. 3, there is shown the application of suction to the corner 10A. The suction flow is generalized by the stream line 18. When the suction is applied to the upper trailing edge 10A the upper mixing layer 16A is deflected downward toward the bottom mixing layer 16B to close the stagnant fluid 14 within a body thickness or so from the body 10. The edge suction can be considered to generate a bound circulation represented by the closed curve 20. This bound circulation creates the lift.

Figure 3:
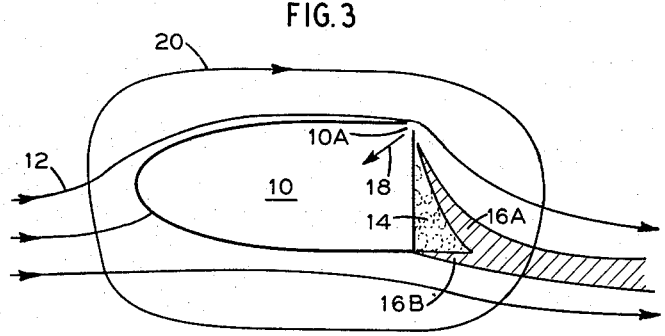
FIG. 3 illustrates schematically the effect of edge suction at one of the trailing edges of the bluff body.

A configuration similar to that shown in FIG. 3 at a zero angle of incidence has yielded a lift coefficient of the order of one in laboratory experiments. This is a value comparable to maximum lift coefficients obtainable with conventional airfoils at any angle of incidence.

Figure 4:
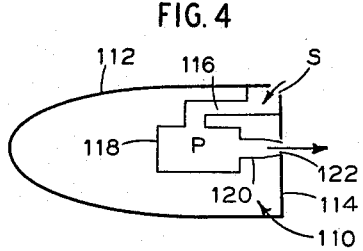
FIG. 4 shows schematically a bluff body utilizing peripheral edge suction to create lift and also including means for minimizing momentum drag.

In FIG. 4, there is shown apparatus for creating the required suction and for disposing of the suction flow. In particular, the bluff body 110 has a side wall 112 and a rear wall 114 angularly connected thereto. At the junction of the side wall 112 and the rear wall 114, there is provided a slot S or opening along the respective peripheral edges of the walls. The slot communicates with a conduit 116 which is connected to a pump means 118. The pump means is further connected to a conduit 120 which may be in the form of a nozzle and communicates with the opening 122 in the rear wall 114. Pump means 118 draws fluid through opening or slot S and expels the fluid from the conduit 120 to the opening 122. The expelled fluid from the opening 122 can also be used to compensate for momentum drag which arises from the removing of fluid at the opening S.

Figure 5:
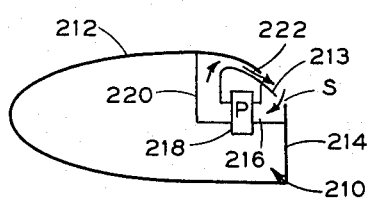
FIG. 5 shows a bluff body with a sloping side wall and including means to utilize the Coanda effect.

In FIG. 5, the bluff body 210 has a side wall 212 with a portion 213 which slopes toward the fore-body axis of the body and a rear wall 214. At the junction of the sloping portion 213 and the rear wall 214, there is provided the opening or slot S. Slot S communicates with conduit 216 which is connected to pump means 218 whose output is connected via conduit 220 to opening 222 upstream of the sloping portion 213. Pump means 218 applies suction to slot S and disposes of the drawn-in fluid via opening 222. The fluid from opening 222 is blown along the sloping portion 213 to prevent fluid separation above the slot S by a Coanda effect. Such a scheme produces a very effective two dimensional lifting surface.

In FIG. 6, there is shown a means for automatically generating the slot suction. Again, the bluff body 310 has a side wall 312 and a rear wall 314. At the junction of the peripheral edges of the sidewall 312 and the rear wall 314 there is an opening or a slot S. The slot S is connected via a conduit 316 and a valve means 318 to a conduit 320 which communicates with an opening 322 in side wall 312. Opening 322 is positioned at the minimum pressure point on the hose of body 310 so that the conventional Bernoulli effect draws fluid from conduit 320 and in turn from conduit 316 and slot S. In order to regulate the suction rate the valve 318 may be provided between the conduits 316 and 321.

In FIG. 7, there is shown the slot geometry for each of the embodiments. The slot S is disposed at the peripheral edges of the side wall N12 and the rear wall N14. The plane of the slot makes an angle A with the side wall N12. In addition, the gap width of the slot is indicated by the reference character D. The gap angle for the embodiments of FIGS. 4 and 6 is preferably from thirty to ninety degrees, whereas for the embodiment of FIG. 5 this angle should not exceed the angle between the rear wall 214 and the sloping wall 213. In each of the embodiments the gap width is preferably in the range of from five-thousandths to five-hundredths of the thickness of the body.

There has thus been shown an improved method of exerting lateral forces, on lift, on a bluff body moving through a viscous fluid by utilizing peripheral slot suction along the adjacent edges of the side and rear walls of the body.

Additionally, several embodiments of bluff bodies utilizing peripheral edge suction have been shown. Each of the bodies has advantages in addition to those arising from the generation of lateral forces on a bluff body by peripheral edge suction. In particular, the embodiment of FIG. 4 has the further advantage of minimizing the effects of momentum drag, that of FIG. 5 of utilizing the Coanda effect, while that of FIG. 6 provides for the automatic generation of the required suction.

While only a limited number of embodiments of the invention have been shown and described in detail, there will now be obvious to those skilled in the art many modifications and variations satisfying many or all of the objects of the invention but which do not depart from the spirit thereof as defined by the appended claims.

What is claimed is:

1. The method of generating a lateral force on a bluff body having a substantially flat rear wall with an opening therein and a side wall angularly connected to said rear wall and defining a continuous slotted corner between said walls, comprising moving said body through a viscous fluid, applying suction to said fluid at said slotted corner, and discharging said fluid through said opening in said rear wall.

2. The method of claim 1 wherein said side wall is along the top of said body and substantially parallel to the direction of fluid flow over said side wall whereby a lift force is exerted on said body.

3. In combination, a bluff body for movement in a homogeneous fluid, said body including a side wall having a peripheral edge and a substantially flat rear wall having a peripheral edge angularly connected to the adjacent peripheral edge of said side wall to define a continuous corner, a peripheral opening being provided along said continuous corner, at least another opening being provided in said rear wall, conduit means within said body for connecting the openings, and fluid moving means associated with said conduit means for drawing fluid via peripheral opening into said conduit means, and discharging fluid from said conduit means via the other of said openings.

4. The combination of claim 3 wherein said peripheral opening is a slot, said other opening is in said rear wall and said fluid moving means applies suction to said slot to introduce a lateral component of force to said body and expels fluid out the opening in said rear wall to compensate for the momentum drag resulting from drawing fluid into said slot.

5. The combination of claim 4 wherein the slot angle of the slot with respect to the surface of the side wall is from thirty to ninety degrees and the gap width of the slot is between five-thousandths and five-hundredths of the thickness of the body.

6. The combination of claim 3 wherein a portion of the side wall slopes toward the fore-body axis of the body, said side and rear walls form a substantially sharp corner, said peripheral opening is a first slot along portions of the adjacent peripheral edges of the sloping part of the side wall and the rear wall, said other opening being a second slot along the upstream edge of the sloping portion of the side wall, and said fluid moving means applies suction to said first slot to introduce a lateral component of force to said body and expels fluid from said second slot along the sloping portion of the side wall to prevent separation of fluid from the surface of the sloping side wall.

7. The combination of claim 6 wherein the slot angle of the first slot with respect to the surface of the sloping side wall is from thirty to ninety degrees and the gap width of the slot is between five-thousandths and five-hundredths of the thickness of the body.

8. The combination of claim 3 wherein said peripheral opening is a slot, said other opening is in the nose portion of the side wall near the minimum pressure region whereby fluid is drawn out from said opening to apply suction via said conduit means to said slot.

9. The combination of claim 3 wherein the slot angle of the slot with respect to the surface of the side wall is from thirty to ninety degrees.

10. The combination of claim 8 further comprising a valving means in said conduit means to control the suction applied to said slot.

References Cited

UNITED STATES PATENTS

| | | | |
|---|---|---|---|
| 2,406,918 | 8/1946 | Stalker | 244—42 |
| 2,407,185 | 9/1946 | Stalker | 244—42 |
| 2,554,187 | 5/1951 | Griffith | 244—42 |

FOREIGN PATENTS 586,496    8/1929    Germany.

FERGUS S. MIDDLETON, *Primary Examiner.*
MILTON BUCHLER, *Examiner.*
FERGUS S. MIDDLETON, *Primary Examiner.*